United States Patent Office.

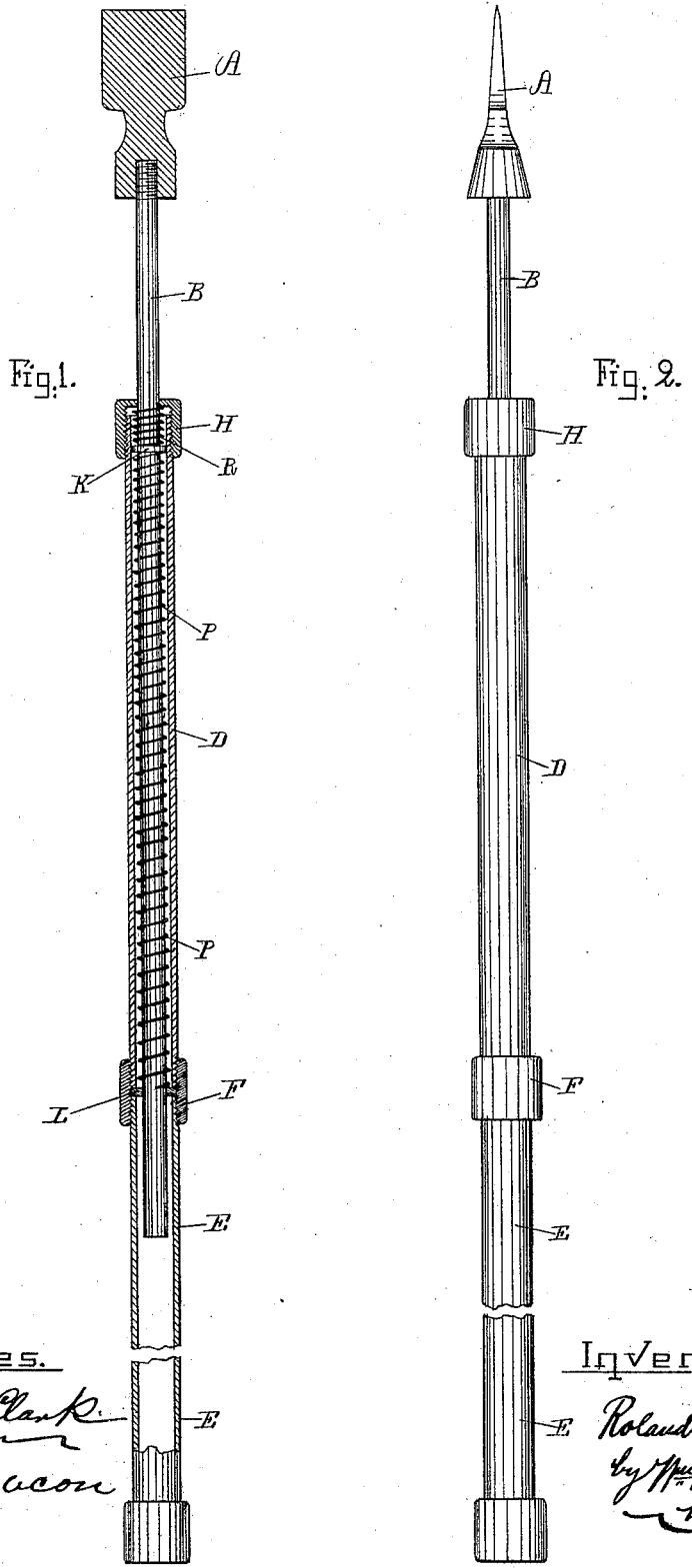

ROLAND B. HOLDEN, OF BILLERICA, MASSACHUSETTS.

PRUNING IMPLEMENT.

SPECIFICATION forming part of Letters Patent No. 358,665, dated March 1, 1887.

Application filed January 13, 1886. Serial No. 188,410. (No model.)

*To all whom it may concern:*

Be it known that I, ROLAND B. HOLDEN, of Billerica, in the county of Middlesex, State of Massachusetts, have invented certain new and useful Improvements in Pruning Implements, of which the following is a full, clear, concise, and exact description, reference being had to the drawings accompanying and forming a part hereof, in which—

Figure 1 is a central sectional view of my improved implement, and Fig. 2 is a side view showing the edge of the pruning-chisel.

The object of my invention is the construction of a simple and effective implement for pruning the small shoots or branches from trees; and it consists, essentially, in a knife or chisel provided with a shank which is received in the hollow handle of the implement and is surrounded by spiral springs, which act to keep the chisel, when not in use, projected some distance from the handle, and which when it is projected receive it, all as is hereinafter more fully set forth.

Pruning implements similar in appearance, and to some extent in construction, to my improved device have been previously constructed. These consist, so far as known to me, in a pruning-chisel set rigidly in the end of a handle, the other end of the handle being provided with a projecting spindle or rod on which a weight is adapted to slide, which is used as a hammer to drive the chisel through the branch, and another device having a chisel provided with a shank which telescopes into the handle, but is not normally projected therefrom or provided with springs or other device for this purpose.

I will describe my invention, having reference to the accompanying drawings, in which like letters of reference indicate like parts.

A is the chisel or cutting-tool, and B is a shank rigidly secured thereto. The handle, which is hollow, is, for convenience of construction, made in two sections, D and E, which are secured together by a screw-threaded band, F, into which the proximate ends of each section are screwed, as shown in Fig. 1. The other end of section D is fitted with a cap, H, which may be screwed on, as shown, and which has a central hole large enough to permit the shank B to slide easily through it.

The shank B has a collar, K, fast thereto, and which is of a diameter to permit it to move freely up and down in the hollow handle D. A similar collar, L, is set fast in band F, between the ends of sections D and E of the handle, and is provided with a central hole sufficient in size to permit the shank B to slide easily through it. Between the collars K and L, and encircling the shank, is a spiral spring, P, which is compressed as the shank is moved into the handle. On the opposite side of collar K is another spiral spring, R, also encircling the shank B, and bearing at one end against the collar and at the other against the top of cap H on the end of the handle. The first-described spring, P, acts to expel the shank of the chisel from the handle and hold it in that position when the chisel is not engaged in cutting off a branch, and the spring R acts to receive the shank when it is projected outward by the spring P, and prevent the collar K from striking against the cap H, which would be liable to injure in a short time either the cap or collar, or both.

The handle should be of metal, preferably piping, which renders its construction cheap and easy and gives it the necessary weight.

The operation of the implement is as follows: The chisel-edge is laid against the branch at the point where it is desired to cut it off, and the handle is thrown against the chisel with the force necessary to drive it through the part to be cut, the end of cap H striking the butt of the chisel. The handle is thus a powerful hammer, by which the chisel can be easily driven through a limb of considerable thickness. As soon as the chisel has severed the limb the spring P acts to expel the shank from the handle until the collar K is received by spring R.

By the use of my improved implement above described a limb may be easily and speedily cut from a tree at the precise point desired without the risk of injuring any of the surrounding parts.

As will be obvious, an air-chamber might be employed in place of spring R to receive the shank of the chisel when it is projected outward by the spring P, or a rubber cushion might be inserted in cap H, which would answer the same purpose.

What I claim is—

The combination of the chisel and its shank and expelling-spring P with the hollow handle and the receiving-spring R, all as described, and for the purposes set forth.

ROLAND B. HOLDEN.

Witnesses:
WM. A. MACLEOD,
MATTHEW CLARK.